UNITED STATES PATENT OFFICE.

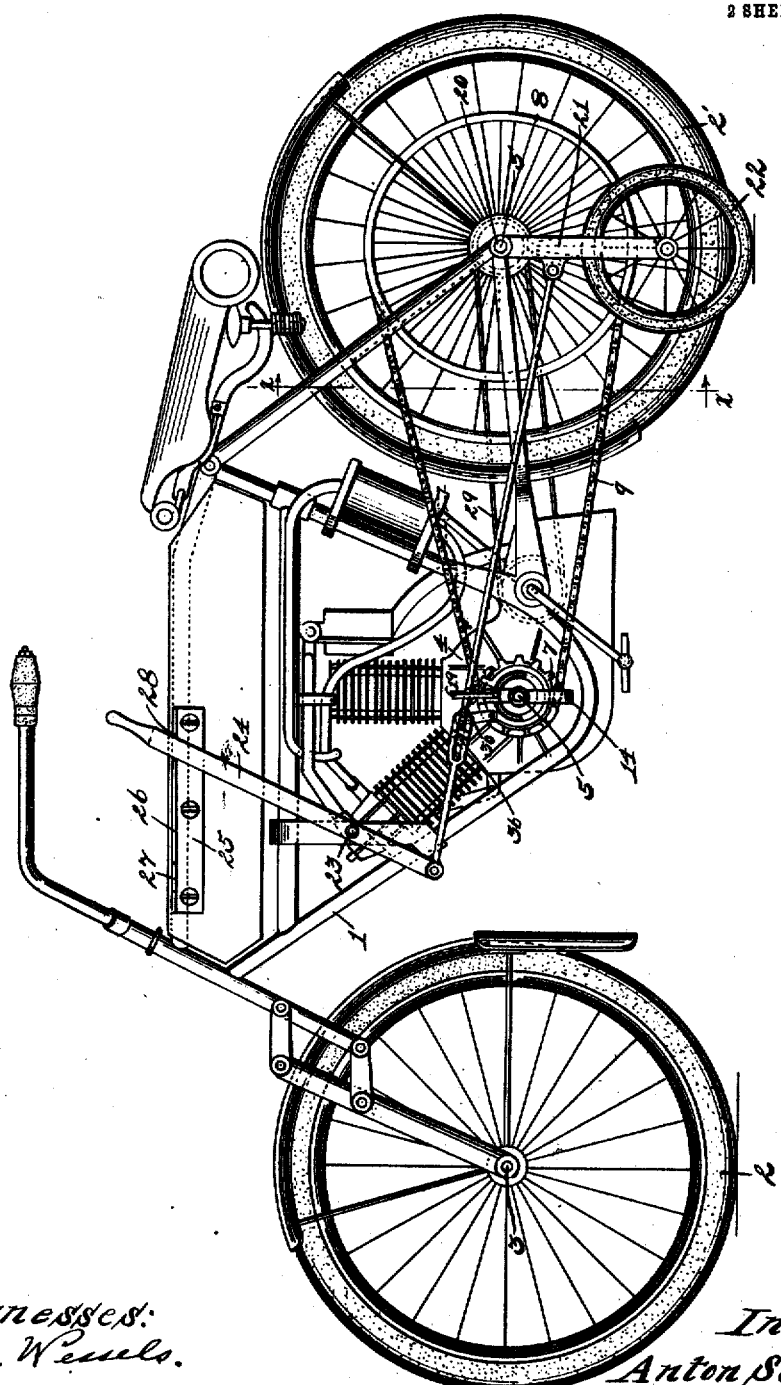

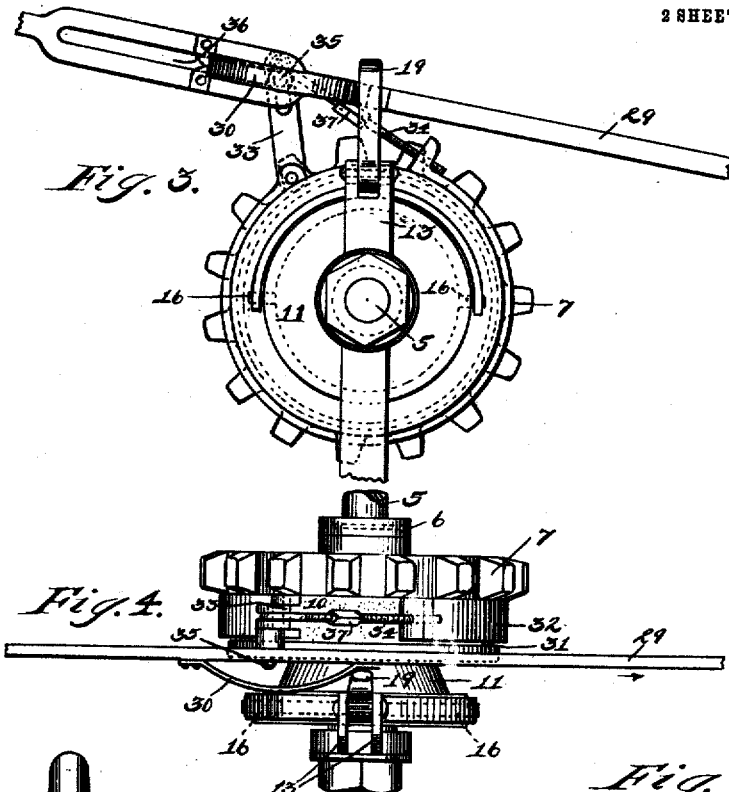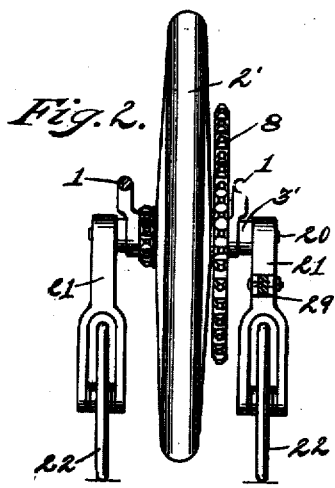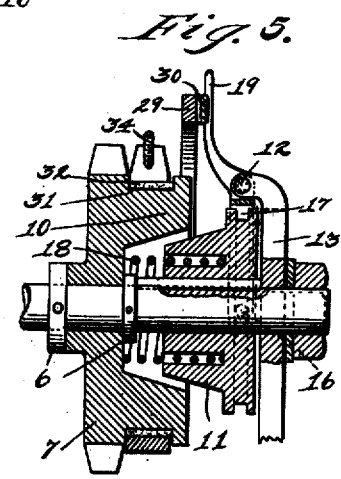

ANTON SWANSON, OF CHICAGO, ILLINOIS.

MOTOR-CYCLE.

1,006,804.	Specification of Letters Patent.	Patented Oct. 24, 1911.

Application filed March 19, 1910. Serial No. 550,309.

*To all whom it may concern:*

Be it known that I, ANTON SWANSON, a citizen of the United States, residing at Chicago, county of Cook, and State of Illinois, have invented certain new and useful Improvements in Motor-Cycles, of which the following is a specification.

My invention relates to improvements in bicycles and more specifically to the motor-driven or motorcycle type thereof.

The object of my invention is the provision in a bicycle of the character mentioned of means whereby the same may be supported in an upright position when inert.

A further object is the provision in conjunction with the operating means of the supporting means mentioned of operative connection between said operating means and the engine clutch and the bicycle brake whereby, actuating said operating means to operatively position said supporting means will effect the application of the brake and the gradual opening of the clutch and vice versa when said operating means are thrown to inoperatively position said supporting means.

A further object is the provision in a motorcycle of improvements as mentioned which will be of durable and economical construction and efficient in operation.

Other objects will appear hereinafter.

With these objects in view my invention consists in improvements in a motorcycle characterized as above mentioned and in certain details of construction and arrangement of parts all as will be hereinafter fully described and more particularly pointed out in the appended claims.

My invention will be more readily understood by reference to the accompanying drawings forming a part of this specification, and in which, Figure 1 is a side view of a motorcycle in which is embodied the preferred form of my invention, Fig. 2 is a vertical transverse section taken on substantially line x—x of Fig. 1, Fig. 3 is an enlarged detail elevation of the power shaft of the engine, shown in Fig. 1, and certain parts coacting therewith, Fig. 4 is a top plan view thereof, and Fig. 5 is a section taken of Fig. 4.

Referring now to the drawings 1 designates the frame of the bicycle, 2—2' the front and rear wheels respectively thereof which are mounted upon the shafts 3—3' respectively.

4 indicates the propelling engine which is suitably mounted in the frame 1, and 5 the power shaft of said engine. Loosely mounted upon the shaft 5 between positioning collars 6 pinned to the latter, is a sprocket wheel 7. Connecting said sprocket and a larger sprocket 8 keyed or otherwise secured to the shaft 3' is a sprocket chain 9. Formed upon one side of the sprocket wheel 7 is a female cone-clutch part 10. Splined to the shaft 6 is the male clutch part 11 arranged and designed, as shown, for coöperation with said female clutch part 10. Fulcrumed at 12 to the upper end of a stationary arm 13, the lower end of the latter being rigidly secured as at 14 to a stationary part of the structure, is a fork the lower bifurcated end of which is operatively connected by means of studs 16 with the clutch member 11, said studs engaging a circumferential groove 17 in the periphery of said clutch member. A compression spring 18 interposed between the clutch members 10 and 11 is adapted to normally hold the same in open or disengaged positions, the operative interlocking or closing of said clutch parts being brought about by outward rocking of the upper end 19 of the fork. Thus the operative connection between the propelling engine and the sprocket wheel 7, and hence between said engine and the wheel 2' is effected.

Having their upper extremities secured to the respective ends of a rock shaft 20 mounted in and extending through the shaft 3' are depending forks 21 in the lower end of each of which is mounted a wheel 22. The arrangement is such that when said forks are in depending vertical positions, the wheels 22 will contact the ground and elevate the wheel 2' from the latter, as clearly shown in Figs. 1 and 2, contact of the wheel 2' with the ground being permitted only when said forks are tilted rearwardly, in which event the wheels 22 will evidently be elevated from contact with the ground.

Fulcrumed at 23 to the bicycle frame 1 is a lever 24 the upper end of which projects, as shown, in operative proximity with the bicycle saddle. Provided upon the upper portion of the frame 1 is an angular plate 25 the projecting flange part 26 of the which is notched as at 27 and 28 for engagement by the lever 24, whereby the latter may be held in either operative or inoperative position. Connecting the lower end of said lever and one of the forks 21 is a link 29. With this arrangement it will be seen that upon the rearward tilting of said lever, which tilting effects the forward drawing of the link 29, the wheels 22 will be lowered to operative position; and that upon the reverse operation of said lever, said wheels will be elevated to inoperative position, in either of which positions said lever may be held by engagement with the notches 27 or 28.

Arranged upon the outer side of the link 29 is a projecting curved strap or cam 30 the same being so positioned, as clearly shown in Fig. 4, as to be adapted when said link is forced rearwardly, as before mentioned, to engage the stem 19 of the fork to cause the rocking of the latter to operative position.

Encircling the sprocket wheel 7, more precisely the clutch-part forming portion 10 thereof, the same resting in a circumferential channel 31 provided in the periphery thereof is a friction strap 32 adapted to constitute a brake. The respective ends of said strap are connected, as clearly shown in Fig. 3, by links 33 and 34 with a pin 35 loosely engaging an elongated slot 36 provided in the link 29. In order to permit of adjustment of the strap 32 about the sprocket 7, the link 34 is formed in two parts, which parts are connected by a turnbuckle 37. The connection between the link 29 and the strap 32 is such that upon the forward reciprocation of the former the latter will be drawn by said link tightly around the sprocket 7 to effect the braking thereof and hence of the rear wheel of the bicycle; and that when said link is at its rear position relaxation of said strap will be permitted. Hence, with the arrangement set forth, provision is made in the form of wheels 32 for the positive support of the bicycle when inoperative, the operating lever 24 of said supporting wheels being so connected with the bicycle brake and clutch that when said lever is thrown to operative position, relative to the supporting wheels, said clutch will simultaneously be thrown out and said brake thrown into operative engagement. This construction therefore presents an arrangement whereby the ordinary bicycle will be automatically converted into a tricycle at intervals when other forces which serve to hold the same upright when in motion, cease to so act upon the same.

While I have shown what I deem to be the preferable form of my improvements I do not wish to be limited thereto as there might be various changes made in the details of construction and the arrangement of parts described without departing from the spirit of the invention comprehended within the scope of the appended claims. And although I have shown my improvements as incorporated in a bicycle of a particular design the same may be employed in connection with a bicycle of any other construction to which it is applicable.

Having described my invention what I claim as new and desire to secure by Letters Patent is:

1. The combination with a motorcycle comprising a bicycle, a propelling motor carried by the latter, a driving connection between said motor and the rear wheel of said bicycle, and a clutch interposed in said connection, of a pair of supplemental wheels carried by the frame of said bicycle, said wheels being adapted to be rocked to contact with the ground to support the bicycle in upright position or to be elevated from engagement therewith, means for operating said wheels, and a connection between said means and said clutch whereby said clutch will be closed when said supplemental wheels are elevated and opened when said wheels are lowered to contact with the ground, substantially as described.

2. The combination with a motorcycle comprising a bicycle, a propelling motor carried by the latter, a driving connection between said motor and the rear wheel of said bicycle, a clutch interposed in the connection between said motor and said wheel, and a brake for the clutch for said wheel, of a pair of supplemental wheels carried by the frame of said bicycle, said wheels being adapted to be rocked to contact with the ground to support the bicycle in upright position or to be elevated from engagement therewith, means for operating said wheels, and a connection between said operating means and said clutch and brake whereby said clutch will be closed and said brake relaxed when said wheels are elevated, and whereby said clutch will be opened and said brake operative when said wheels are lowered, substantially as described.

3. The combination with a motorcycle comprising a bicycle, a propelling motor carried thereby, a driving connection between said motor and the rear wheel of said bicycle, a clutch interposed in said connection, and a brake for said clutch, of a pair of forks rockingly mounted at either side of the rear of said rear wheel of said bicycle, supplemental wheels carried by said forks, said wheels being adapted to be rocked to contact the ground so as to elevate said rear bicycle wheel from contact therewith or to be elevated from engagement with the ground, means for operating said wheels, and an operative connection between said means and said clutch and brake whereby said clutch will be closed and said brake relaxed when said supplemental wheels are elevated, and whereby said clutch will be opened and said brake operative when said supplemental wheels are lowered into contact with the ground, substantially as described.

In testimony whereof I have signed my name to this specification in the presence of two subscribing witnesses.

ANTON SWANSON.

Witnesses:
JANET E. HOGAN,
JOSHUA R. H. POTTS.